United States Patent
Feucht et al.

(10) Patent No.: US 11,292,095 B2
(45) Date of Patent: Apr. 5, 2022

(54) SPINDLE DEVICE AND MACHINE TOOL HAVING A SPINDLE DEVICE

(71) Applicant: SAUER GmbH, Stipshausen (DE)

(72) Inventors: Florian Feucht, Abtsgmund (DE); Jens Ketelaer, Wiesbaden (DE); Manuel Praetorius, Rhaunen (DE); Gaston Schwenk, Simmern (DE)

(73) Assignee: SAUER GmbH, Stipshausen (DE)

( * ) Notice: Subject to any disclaimer, the term of this patent is extended or adjusted under 35 U.S.C. 154(b) by 174 days.

(21) Appl. No.: 15/527,679

(22) PCT Filed: Nov. 18, 2015

(86) PCT No.: PCT/EP2015/077011
§ 371 (c)(1),
(2) Date: May 17, 2017

(87) PCT Pub. No.: WO2016/079203
PCT Pub. Date: May 26, 2016

(65) Prior Publication Data
US 2017/0361409 A1    Dec. 21, 2017

(30) Foreign Application Priority Data

Nov. 18, 2014 (DE) .......................... 102014223544.8

(51) Int. Cl.
*B23Q 5/04* (2006.01)
*B23Q 1/00* (2006.01)
(Continued)

(52) U.S. Cl.
CPC ............. *B23Q 1/0009* (2013.01); *B23Q 1/70* (2013.01); *B23Q 5/043* (2013.01); *B23Q 5/10* (2013.01);
(Continued)

(58) Field of Classification Search
CPC .... B23Q 1/0009; B23Q 17/2471; B23Q 5/10; B23Q 5/043; B23Q 1/70; B23Q 17/12; H02J 50/10
(Continued)

(56) References Cited

U.S. PATENT DOCUMENTS 3,347,453 A * 10/1967 Goergen ................. F25B 21/04
494/1
3,445,697 A * 5/1969 Costa .................... G01R 31/343
310/68 R (Continued)

FOREIGN PATENT DOCUMENTS

DE        42 01 013 A1    7/1993
DE   10 2005 011 197 A1   9/2006
(Continued)

OTHER PUBLICATIONS

First Office Action for corresponding Japanese Patent Application No. 2017-544997 with English translation, 7 pgs., (Sep. 5, 2018).
(Continued)

*Primary Examiner* — Robert F Long
(74) *Attorney, Agent, or Firm* — Womble Bond Dickinson (US) LLP

(57) ABSTRACT

The invention relates to a spindle device (100), comprising: a tool holder (14) for holding a tool or a tool interface; a spindle drive comprising a spindle rotor (130) for rotationally driving the tool holder (14); an electrical load (160), which is arranged on the side of the spindle rotor (130) facing the tool holder (14); and a coil unit (140) for supplying electrical energy to the electrical load (160); wherein the coil unit (140) is arranged on the side of the spindle rotor (130) facing away from the tool holder (14).

30 Claims, 6 Drawing Sheets

(51) Int. Cl.
  *B23Q 1/70* (2006.01)
  *B23Q 17/12* (2006.01)
  *H02J 50/10* (2016.01)
  *B23Q 5/10* (2006.01)
  *B23Q 17/24* (2006.01)

(52) U.S. Cl.
  CPC ......... *B23Q 17/12* (2013.01); *B23Q 17/2471* (2013.01); *H02J 50/10* (2016.02)

(58) Field of Classification Search
  USPC .... 173/2, 114, 117, 118, 201–204, 121, 212, 173/176, 132, 48, 104, 109, 217–218
  See application file for complete search history.

(56) References Cited

U.S. PATENT DOCUMENTS

| | | | | | |
|---|---|---|---|---|---|
| 3,470,433 | A * | 9/1969 | Roland | ............... | G04C 3/165 318/400.26 |
| 3,761,774 | A * | 9/1973 | Laughinghouse | ..... | H01H 13/08 361/45 |
| 3,871,138 | A * | 3/1975 | Welsch | ............... | B24B 23/02 451/358 |
| 4,306,164 | A * | 12/1981 | Itoh | ............... | H02K 37/10 310/112 |
| 4,331,883 | A * | 5/1982 | Vitaloni | ............... | F04B 35/04 173/29 |
| 4,462,467 | A * | 7/1984 | Weingartner | ......... | B25D 16/00 173/105 |
| 4,705,980 | A * | 11/1987 | Mishiro | ............... | B06B 1/0622 310/323.19 |
| 4,883,982 | A * | 11/1989 | Forbes | ............... | F04D 25/08 310/62 |
| 4,976,173 | A * | 12/1990 | Yang | ............... | B25F 3/00 173/46 |
| 5,254,896 | A * | 10/1993 | Bradfield | ............... | H02K 13/02 310/232 |
| 5,432,644 | A * | 7/1995 | Tajima | ............... | G11B 19/20 360/99.04 |
| 5,663,504 | A * | 9/1997 | Kluft | ............... | G01H 1/003 73/1.82 |
| 5,770,936 | A | 6/1998 | Hirai et al. | | |
| 5,791,836 | A * | 8/1998 | Feufel | ............... | B23Q 1/0009 408/124 |
| 5,860,615 | A * | 1/1999 | Burch | ............... | H02K 15/0037 242/432.5 |
| 6,096,042 | A * | 8/2000 | Herbert | ............... | A61B 17/1633 606/79 |
| 6,216,798 | B1 * | 4/2001 | Riello | ............... | B23Q 5/10 173/117 |
| 6,260,675 | B1 * | 7/2001 | Muhlenkamp | ............... | F16F 9/535 188/267 |
| 6,520,269 | B2 * | 2/2003 | Geiger | ............... | B25D 11/064 173/114 |
| 8,564,148 | B1 * | 10/2013 | Novak | ............... | F03D 9/11 290/52 |
| 10,315,293 | B2 * | 6/2019 | Kviberg | ............... | B25B 21/02 |
| 2002/0185290 | A1 * | 12/2002 | Tang | ............... | B25F 5/001 173/216 |
| 2003/0163924 | A1 * | 9/2003 | Hempe | ............... | B23D 45/16 30/388 |
| 2005/0140241 | A1 * | 6/2005 | Petersen | ............... | H02K 16/04 310/44 |
| 2005/0172506 | A1 * | 8/2005 | Collingwood | ....... | B23Q 1/0009 33/561 |
| 2005/0247468 | A1 * | 11/2005 | Lamprecht | ............ | H01R 39/54 173/213 |
| 2006/0006976 | A1 * | 1/2006 | Bruno | ............... | H01F 27/263 336/229 |
| 2006/0108890 | A1 * | 5/2006 | Hauger | ............... | H02K 1/16 310/214 |
| 2008/0041604 | A1 | 2/2008 | Sauer | | |
| 2008/0261172 | A1 * | 10/2008 | Rauchenzauner | ....... | A61C 1/05 433/132 |
| 2008/0289440 | A1 * | 11/2008 | Denk | ............... | H02K 7/09 74/89.34 |
| 2008/0306432 | A1 * | 12/2008 | Kumagai | .......... | H01L 21/67092 604/22 |
| 2009/0080990 | A1 * | 3/2009 | McMurtry | ........... | B23Q 1/0009 408/226 |
| 2009/0146530 | A1 * | 6/2009 | Tang | ............... | B23B 31/083 310/323.18 |
| 2009/0152959 | A1 * | 6/2009 | Vollmer | ............... | H02K 41/031 310/12.22 |
| 2010/0087125 | A1 * | 4/2010 | Ohnishi | ............... | B24B 1/04 451/67 |
| 2010/0123359 | A1 * | 5/2010 | Nishikawa | ............... | B25B 21/00 310/50 |
| 2010/0212470 | A1 * | 8/2010 | Ohnishi | ............... | B23D 61/10 83/646 |
| 2010/0236802 | A1 * | 9/2010 | Berger | ............... | B25D 11/064 173/118 |
| 2011/0006621 | A1 * | 1/2011 | Lau | ............... | B25F 5/008 310/50 |
| 2011/0033823 | A1 * | 2/2011 | Gersh | ............... | A61C 17/20 433/119 |
| 2011/0108600 | A1 * | 5/2011 | Pedicini | ............... | B25C 1/047 227/2 |
| 2011/0204786 | A1 * | 8/2011 | Schoen | ............... | B23Q 5/10 315/76 |
| 2011/0204787 | A1 * | 8/2011 | Schoen | ............... | H02K 7/1853 315/76 |
| 2011/0222975 | A1 * | 9/2011 | Short | ............... | B23B 29/125 408/17 |
| 2012/0325507 | A1 * | 12/2012 | Fluhrer | ............... | G01L 5/24 173/20 |
| 2013/0000934 | A1 * | 1/2013 | Tadokoro | ............... | B25B 21/00 173/20 |
| 2013/0000938 | A1 * | 1/2013 | Matsunaga | ........... | B25B 21/008 173/181 |
| 2013/0062088 | A1 * | 3/2013 | Mashiko | ............... | B25B 21/02 173/2 |
| 2013/0133910 | A1 * | 5/2013 | Riedl | ............... | B25D 16/00 173/109 |
| 2014/0054350 | A1 * | 2/2014 | Pedicini | ............... | B25C 5/15 227/8 |
| 2014/0231116 | A1 * | 8/2014 | Pollock | ............... | B25B 21/00 173/183 |
| 2014/0374461 | A1 * | 12/2014 | Pedicini | ............... | B25C 1/06 227/2 |
| 2015/0352713 | A1 * | 12/2015 | Takazakura | ............... | B23Q 37/00 173/2 |
| 2016/0121143 | A1 * | 5/2016 | Mumaw | ............... | G16H 20/40 601/2 |
| 2016/0129542 | A1 * | 5/2016 | Chen | ............... | B24B 1/04 451/37 |
| 2016/0164305 | A1 * | 6/2016 | Maurer | ............... | B23B 31/16045 320/108 |
| 2017/0042568 | A1 * | 2/2017 | Levy | ............... | A61B 17/320068 |
| 2017/0326697 | A1 * | 11/2017 | Van Sprang | ............... | B23Q 17/00 |
| 2017/0333071 | A9 * | 11/2017 | Levy | ............... | A61B 17/54 |
| 2018/0071890 | A1 * | 3/2018 | Ketelaer | ............... | B24B 51/00 |
| 2018/0193925 | A1 * | 7/2018 | Ketelaer | ............... | B23B 31/02 |
| 2020/0180041 | A1 * | 6/2020 | Onikura | ............... | B06B 1/0611 |

FOREIGN PATENT DOCUMENTS

| | | |
|---|---|---|
| DE | 10 2007 007 389 B3 | 7/2008 |
| DE | 10 2008 055 971 A1 | 5/2010 |
| DE | 10 2010 003 338 A1 | 9/2011 |
| JP | 91087501 U | 9/1991 |
| JP | 2008504138 A | 2/2008 |
| JP | 2011-131343 A | 7/2011 |
| JP | 5308599 B1 | 10/2013 |
| WO | 03089188 | 10/2003 |

(56) References Cited

FOREIGN PATENT DOCUMENTS

WO     WO 2003/089188 A1     10/2003
WO     WO 2006/002675 A1     1/2006

OTHER PUBLICATIONS

German Search Report for counterpart German Application No. 10 2014 223 544.8 with partial English translation, 12 pgs. (dated Aug. 3, 2015).
PCT International Search Report for PCT Counterpart Application No. PCT/EP2015/077011 with full English translation, 5 pgs. (dated Mar. 17, 2016).
PCT Written Opinion of the International Searching Authority for PCT Counterpart Application No. PCT/EP2015/077011 with full English translation, 10 pgs. (dated Mar. 17, 2016).
PCT International Preliminary Report on Patentability for PCT Application No. PCT/EP2015/077011 with full English translation, 12 pgs. (dated May 23, 2017).
Office Action for corresponding Chinese Patent Application No. 201580062554.7 with English summary of the Chinese Office Action, 9 pgs., (dated Aug. 20, 2018).
European Office Action for Application No. 15812962.7 dated Dec. 20, 2018, 9 pages.
German Office Action for Application No. 102014223544.8 dated Jan. 21, 2019, 13 pages.
European Office Action for Application No. 15812962.7 dated Sep. 11, 2019, 4 pages.
Chinese Office Action for Application No. 201580062554.7 dated May 7, 2019, 7 pages.

\* cited by examiner

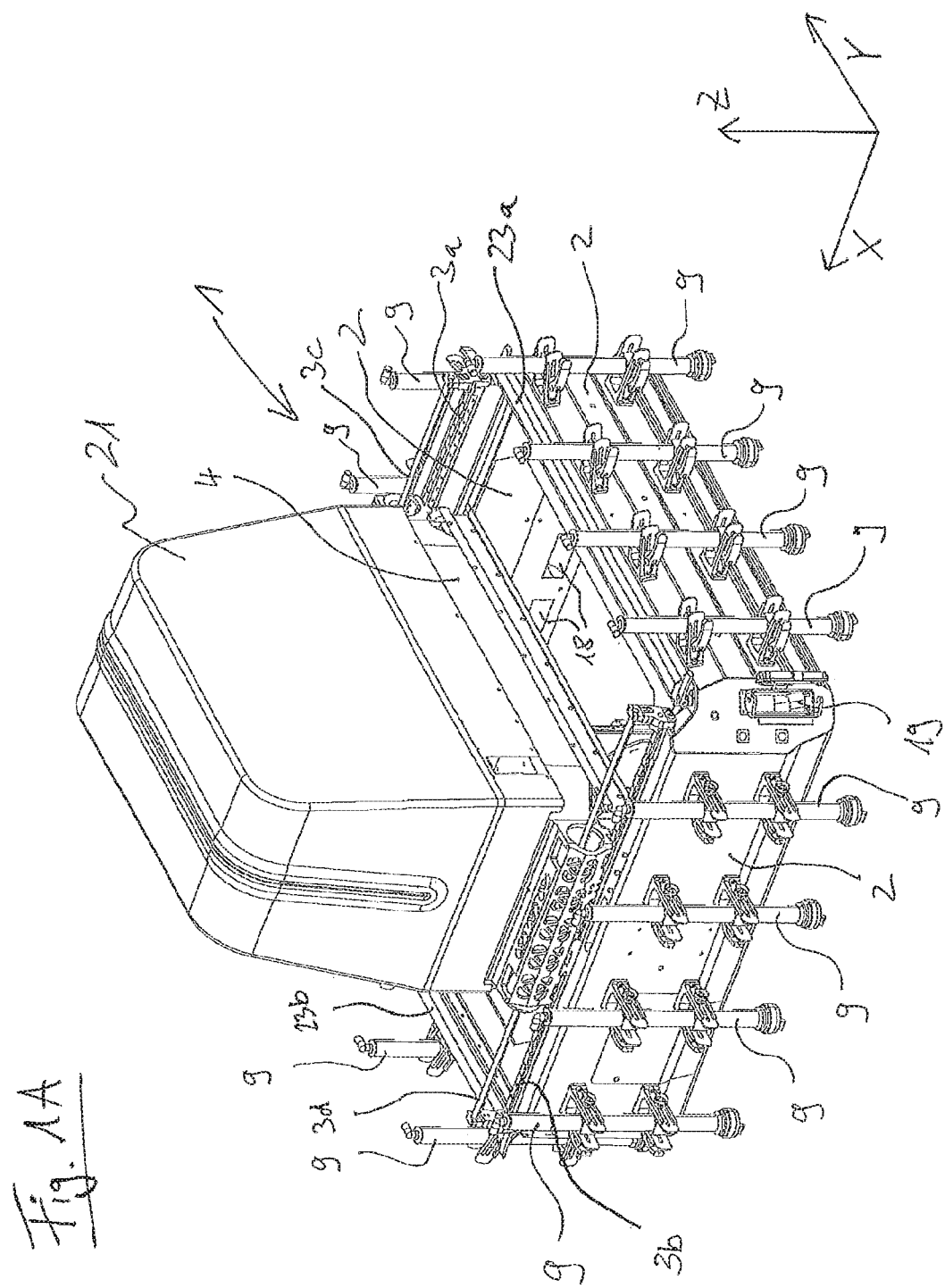

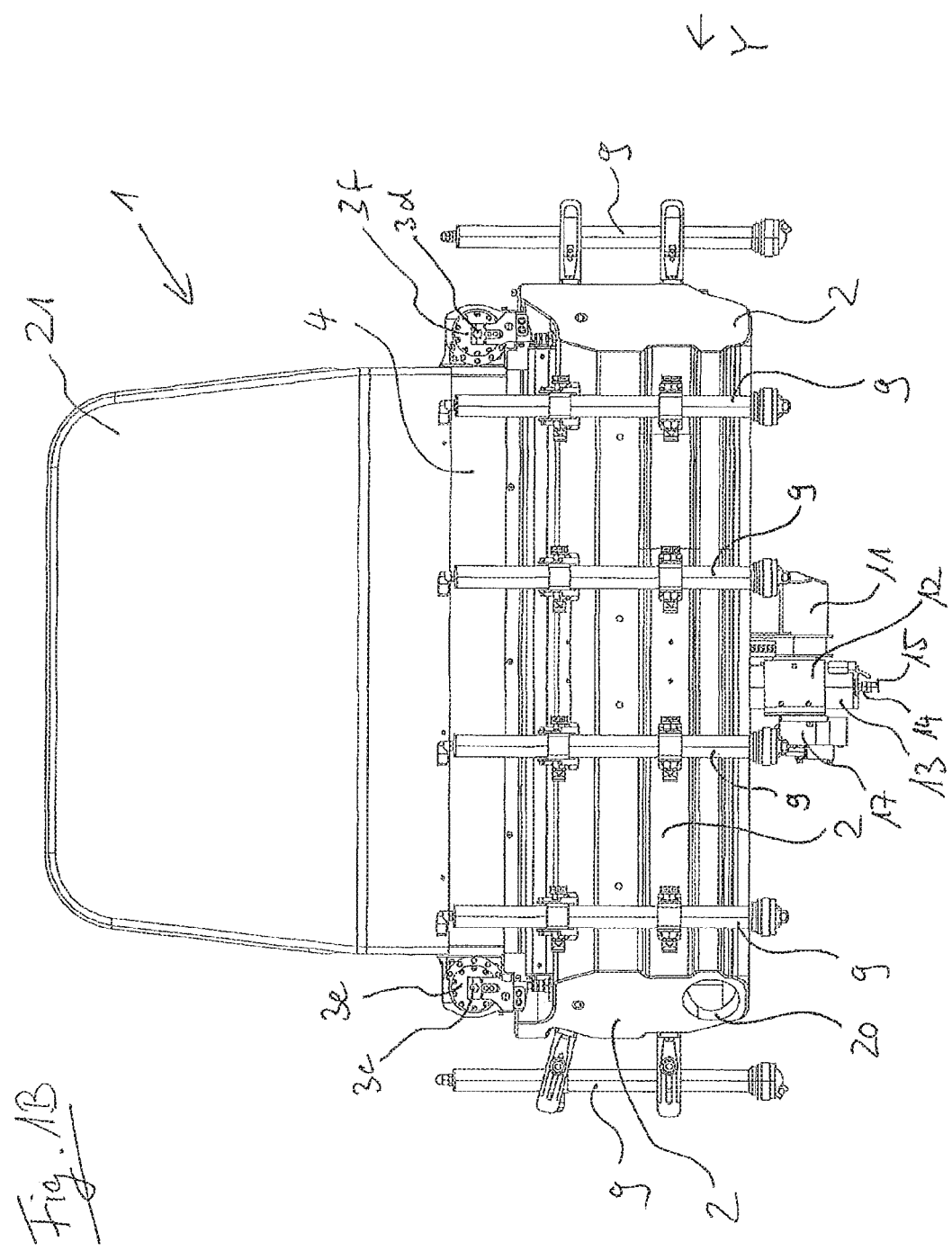

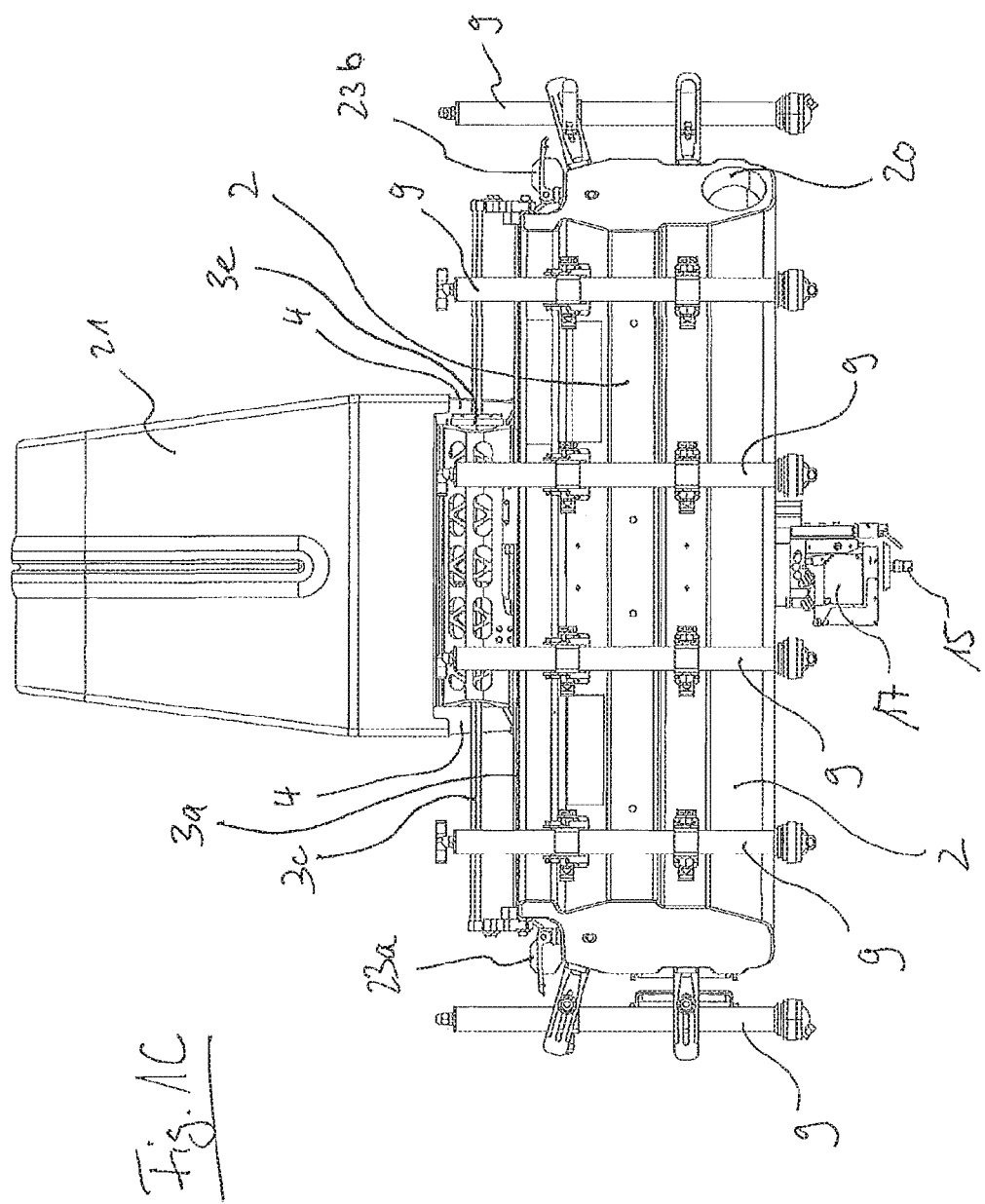

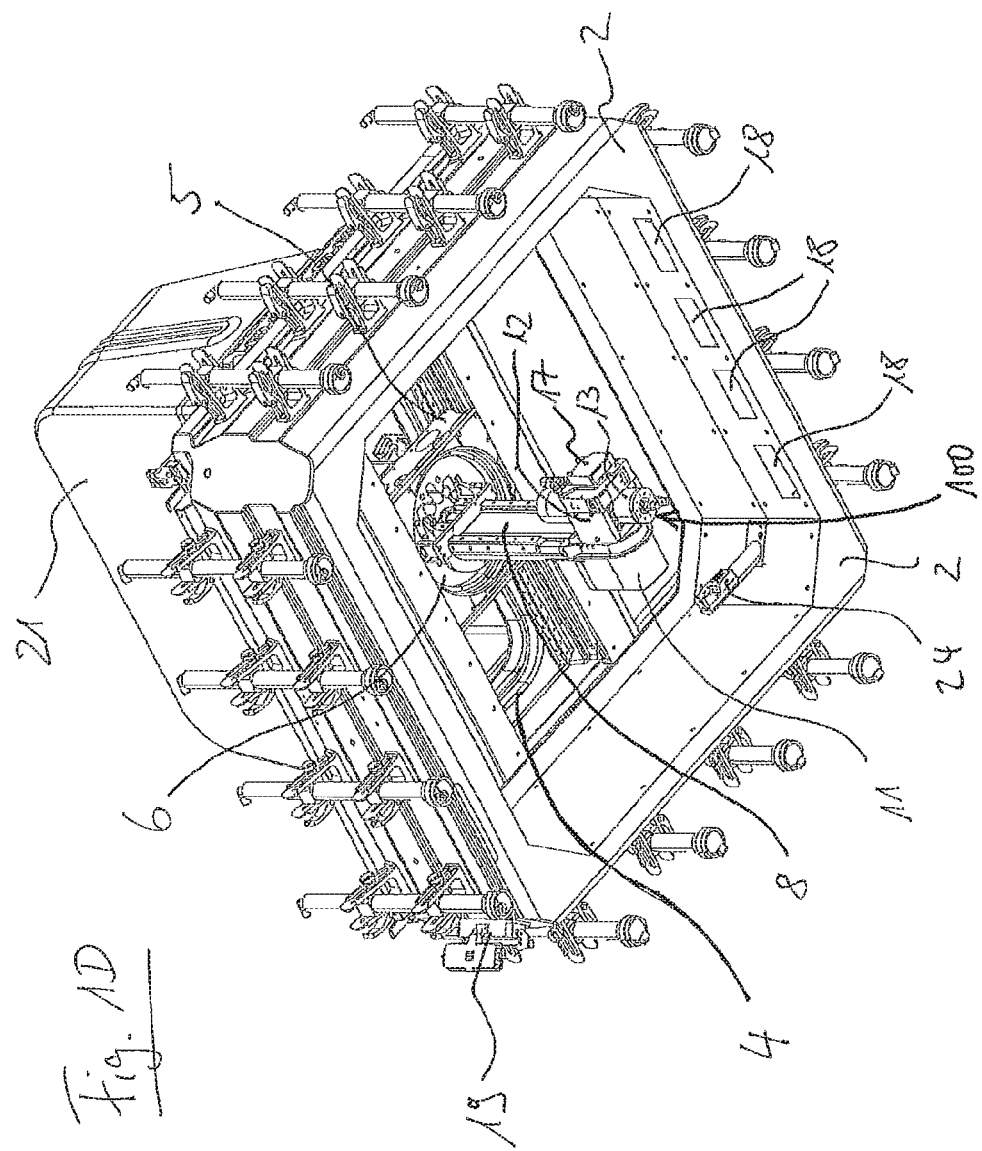

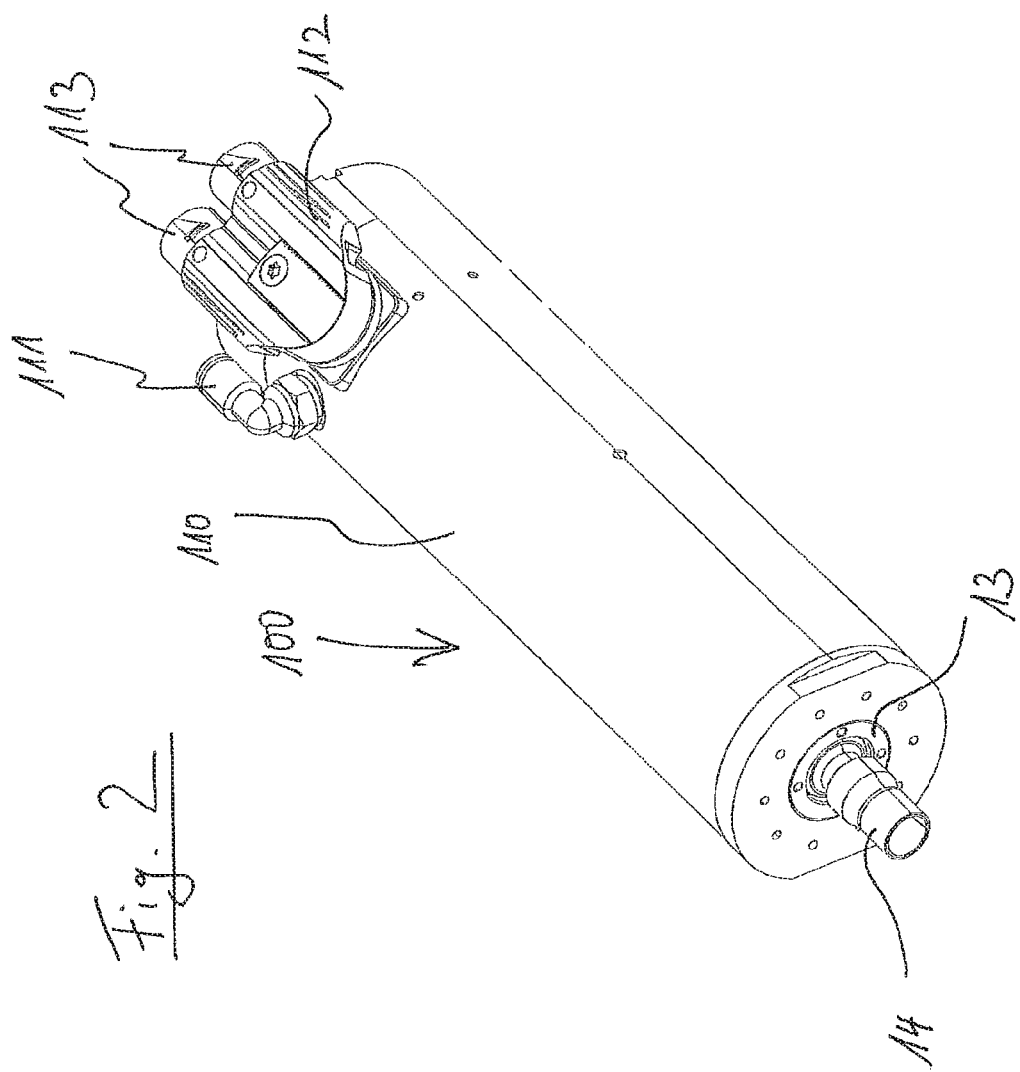

SPINDLE DEVICE AND MACHINE TOOL HAVING A SPINDLE DEVICE

This application is the U.S. National Stage entry under 35 U.S.C. § 371 of international application PCT/EP2015/077011, filed 18 Nov. 2015, which in turn claims priority to German patent application DE 10 2014 223544.8, filed 18 Nov. 2014.

The present invention relates to a spindle device, in particular a spindle device having an additional electrical load (e.g., a vibration means or measuring means) on the tool-receiving side, and a machine tool with such a spindle device or preferably a mobile machine tool or a mobile milling machine with such a spindle device for machining workpieces, in particular for machining surfaces of large workpieces or composite components.

BACKGROUND OF THE INVENTION

Spindle devices of the generic kind are known, e.g., from WO 2006/002675 A1 or EP 0 719 199 A1. According to the above-mentioned prior art, electrical loads (such as, for example, a vibration means or electronic measuring means) are provided on a spindle device for use on a machine tool on a tool head for receiving a tool, wherein the electrical loads can be supplied with electrical energy by means of a coil configuration with a fixed transmitter coil and a rotatably mounted receiver coil when the tool is rotationally driven on the spindle device.

However, the disadvantage of the spindle devices according to the above-mentioned prior art is that the coil configuration with the fixed transmitter coil and the rotatably mounted receiver coil leads to an inappropriately unwieldy, voluminous, bulky design on the tool-side tool head, which, in particular, makes tool changing on the spindle device difficult.

In order to facilitate tool changing, it is suggested, according to EP 0 719 199 A1, that at least one of the coils of the coil configuration is merely formed in the shape of a circular segment. Thereby, tool changing may be facilitated, but with the resultant disadvantage that the efficiency of the energy transfer between the coils deteriorates.

In view of the above-mentioned disadvantages, it is an object of the present invention to provide a spindle device having an additional electrical load on the tool-receiving side which allows for a simple and compact design. Furthermore, it is an object of the present invention to provide a spindle device having an additional electrical load on the tool-receiving side which allows for simple and efficient tool changing, preferably without deteriorating the efficiency of the energy transfer between the coils.

SUMMARY

In order to achieve the above-mentioned objects, a spindle device according to claim 1 and a machine tool, in particular a mobile machine tool, are provided. Dependent claims relate to preferred embodiments of the invention.

According to a first aspect of the invention, a spindle device is provided, the spindle device comprising a tool holder for holding a tool or a tool-holding tool interface, a spindle drive comprising a spindle rotor for rotationally driving the tool holder, at least one electrical load which is arranged on the side of the spindle rotor facing the tool holder, and/or a coil unit for supplying electrical energy to the at least one electrical load. According to the invention, the coil unit is arranged on the side of the spindle rotor facing away from the tool holder.

Herein, the invention is based on the idea of avoiding the voluminous and complicated design of a tool head having a coil unit on the side of the tool holder in addition to the electrical load, and of instead arranging the coil unit for supplying the electrical energy to the electrical load of the spindle device on the side of the spindle rotor facing away from the tool holder.

This provides the advantages that, on the one hand, the design of the spindle device may be made simpler, more compact and less maintenance-intensive without making it difficult to change the tool at the tool holder or the tool interface and, on the other hand, the coils of the coil unit on the side of the spindle rotor facing away can be provided fully without restrictions, so that no losses in the efficiency of the energy transfer between the coils have to be tolerated.

In addition, in contrast to the prior art, the coils of the coil unit may be arranged inside the spindle housing, so that the coil unit can be protected from damage and contamination significantly better than in the prior art.

In advantageous embodiments, the coil unit preferably has a fixed transmitter coil and/or a rotatably mounted receiver coil, in particular preferably with a gap between the transmitter coil and the receiver coil for non-contact energy transfer.

In preferred, advantageous embodiments, the transmitter coil and/or the receiver coil is preferably configured as a full-circumference coil, thereby advantageously making a very high efficiency of the energy transfer between the coils possible, in particular when the two coils are each configured as a full-circumference coil.

Here, the term "full-circumference coil" is understood to mean that the coil conductors are extending over the full circumference in the coil cross-section and the coil is not only formed as a circular segment of a coil or partial coil. The cross section of a "full-circumference coil" is preferably substantially circular, but the invention is not limited to circular coil cross sections, and other coil cross sections are conceivable, e.g., oval, square or polygonal, optionally with rounded corners.

In advantageous embodiments, the rotatably mounted receiver coil is preferably mounted on the side of the spindle rotor facing away from the tool holder at an end portion of the spindle rotor, or preferably fastened directly or indirectly to the spindle rotor. Preferably, the rotatably mounted receiver coil rotates with the rotatable spindle rotor when the spindle of the spindle device is driven by means of the spindle drive.

In an advantageous embodiment, the fixed transmitter coil is preferably attached to a spindle housing receiving the spindle rotor, or preferably fastened directly or indirectly to the spindle housing.

In advantageous embodiments, the coil unit is preferably connected, in particular electrically, by means of electrical lines to the electrical load. In preferred, advantageous embodiments, at least at least one portion of the electrical lines is led axially along an axis of rotation of the spindle rotor from one end of the spindle rotor to the other end of the spindle rotor.

In advantageous embodiments, the spindle rotor preferably has an axially arranged hollow shank element through which the at least one portion of the electrical lines is led axially along the rotational axis of the spindle rotor.

In advantageous embodiments, the electrical load preferably comprises an electronic measuring device, in particular, e.g., an optical measuring device, e.g., with a scanning laser, or an inductive measuring device, or an ultrasonic measuring device.

In particularly preferred, advantageous embodiments, the electrical load comprises one or more vibration units which is/are preferably configured to drive a vibration of the tool holder in the axial direction of the spindle device (for example, by means of an axial oscillator unit), to drive a vibration of the tool holder in one or radial directions of the spindle device (for example, by means of one or more radial oscillator units), and/or to drive a vibration of the tool holder in the rotational direction of the spindle device (for example, by means of a rotational oscillator unit), in particular particularly preferably a vibration having a frequency in the ultrasonic range, respectively. This has the advantage that, in particular, the machining of composite materials or composite components is improved because the additionally provided vibration of the tool received directly or indirectly via a tool interface in the axial, radial and/or rotational direction at the tool holder results advantageously in a greatly reduced or avoided fraying at the machined parts of the processed workpiece.

In advantageous embodiments, the vibration unit comprises a piezoelectric actuator or the vibration unit comprises a plurality of piezoelectric actuators, wherein at least some or all of the plurality of piezoelectric actuators are disposed successively in the axial direction in preferred exemplary embodiments.

In advantageous embodiments, the vibration unit is mounted non-rotatably on the tool holder or is preferably attached or fastened directly or indirectly to the tool holder or a portion of the tool holder facing the spindle rotor.

In advantageous embodiments, the tool holder is connected to the spindle rotor via a labyrinth coupling. In particular in embodiments with a vibration unit or piezoelectric drive for driving a vibration of the tool holder, the advantage is that the tool holder is connected to the spindle rotor such that a vibration of the tool holder in small amplitudes is possible without direct transfer of the vibration to the spindle rotor, wherein the rotary motion of the spindle rotor can nevertheless be transmitted to the tool holder excellently and without loss.

In advantageous embodiments, the tool holder is configured to hold a tool directly (i.e., without an intermediate tool interface). This provides the advantage that the spindle device may be provided even more compactly and, extremely advantageously, also for smaller or mobile machine tools, since an additional voluminous tool interface (such as a hollow shank taper interface or a steep taper interface) is omitted.

In other advantageous embodiments, the tool holder is configured to hold a replaceable tool interface, in particular a hollow shank taper tool interface or a steep taper interface. This has the advantage that the compact and reliable design of the spindle device may also be used if replaceable tool interfaces are provided which nevertheless allow for simple tool changing, since unlike in the prior art of EP 0 719 199 A1, no coil of the coil unit is arranged on the tool interface.

According to a second aspect of the invention, a machine tool for machining a workpiece with a tool is provided, the machine tool comprising a spindle device, in particular according to one of the preceding aspects or embodiments or a combination thereof, for driving the tool held on the tool holder of the spindle device.

In summary, the present invention advantageously allows to provide a spindle device which allows for a simple and compact design and furthermore allows for simple and efficient tool changing, preferably without deteriorating the efficiency of the energy transfer between the coils.

Aspects of the present invention are described below by way of example with reference to the accompanying schematic drawings.

BRIEF DESCRIPTION OF THE DRAWINGS

In the drawings:

FIG. 1A shows a schematic perspective view of a machine tool seen obliquely from above, FIG. 1B shows a schematic front view of the machine tool, FIG. 1C shows a schematic side view of the machine tool, FIG. 1D shows a schematic perspective view of the machine tool seen obliquely from below, FIG. 2 shows a schematic perspective view of a spindle device according to an embodiment of the present invention.

Figure 3:
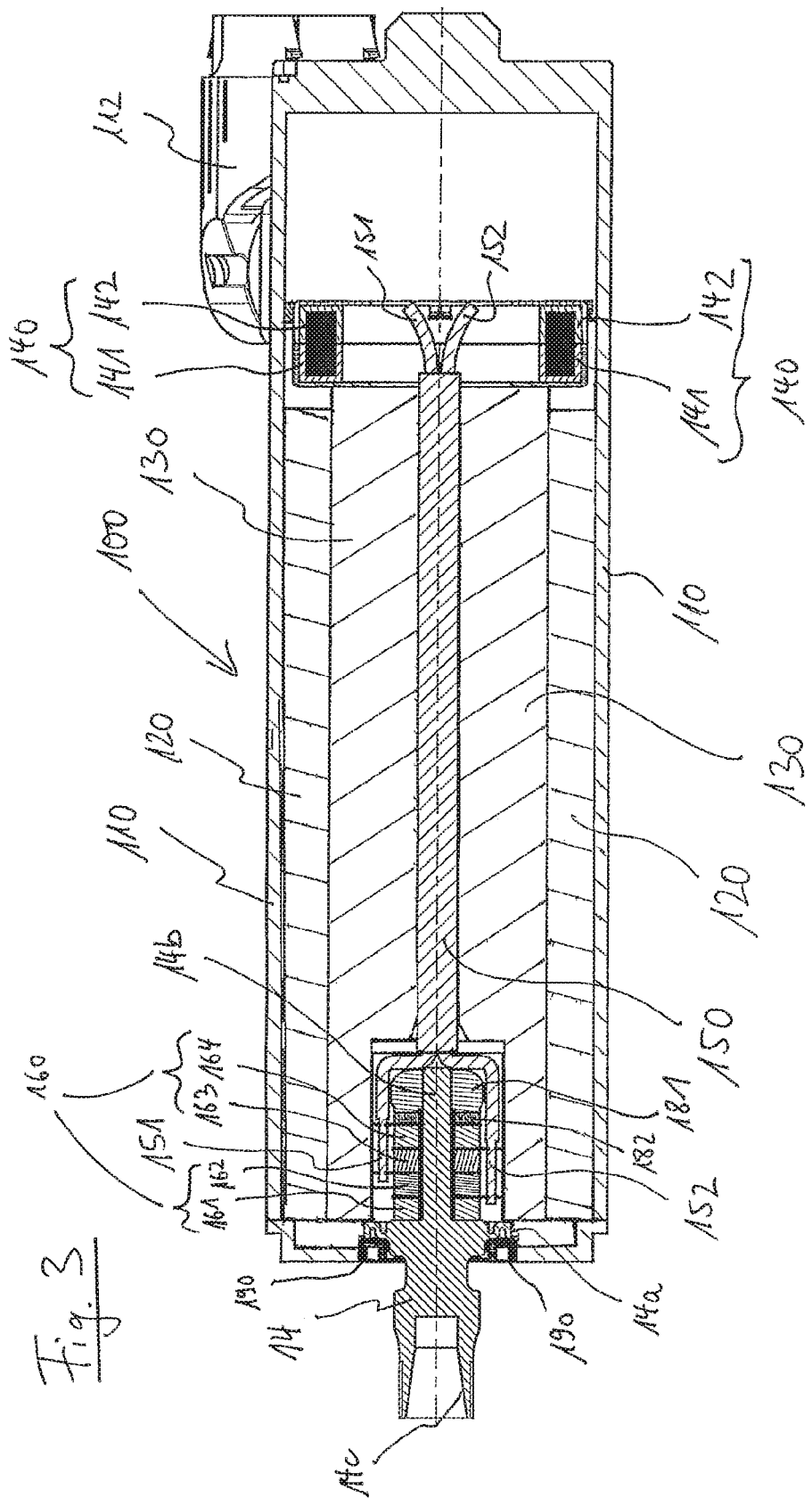
FIG. 3 shows a schematic sectional view of the spindle device according to an embodiment of the present invention.

DETAILED DESCRIPTION OF THE DRAWINGS AND OF PREFERRED EMBODIMENTS OF THE INVENTION

In the following, examples of the present invention will be described in detail with reference to the figures. Identical or similar elements in the figures are designated by the same reference signs. However, the present invention is not limited to the described embodiments, but also includes modifications of features of the described examples and combinations of features of various examples within the scope of the independent claims.

FIGS. 1A to 1D show schematic views of an exemplary mobile machine tool 1 which is exemplarily equipped with a spindle device according to an embodiment.

FIG. 1A shows a schematic perspective view of the machine tool 1 seen obliquely from above, FIG. 1B shows a schematic front view of the machine tool 1, FIG. 1C shows a schematic side view of the machine tool 1, and FIG. 1D shows a schematic perspective view of the machine tool 1 seen obliquely from below.

As a basic frame, the machine tool 1 comprises, e.g., a rectangular or essentially square-shaped frame, which is formed, e.g., from a monolithically formed frame element 2 made of a fibre reinforced plastic, in particular from a carbon fibre reinforced plastic, on which optionally additional elements may be mounted such as cover plates or the like. Preferably, the frame width and/or the frame length are approximately 0.5 to 1.5 m.

In the interior of the frame element 2, the machine tool 1 has a machining space, which is completely enclosed by the monolithic frame element 2. On two opposing frame portions of the four frame portions of the frame element 2, guides 3a and 3b extending in X-direction for a controllable X linear axis (first linear axis) are mounted directly on the two opposing frame portions of the frame element 2.

An X carriage 4 movable in the X direction is guided by the guides 3a and 3b. Preferably, the X linear axis has a respective length measuring system on at least one and preferably on each of the two opposing frame portions on each of the guides 3a and 3b, so that the position of the X carriage 4 of the X linear axis can be determined on one and preferably on both sides.

The X linear axis includes, for example, a respective screw drive with a respective screw shaft 3c or 3d on both sides of the X carriage. On the screw shafts 3c and 3d, drives 3e and 3f are held, which are attached or disposed laterally at the X carriage 4. The drives 3e and 3f are configured to move the X carriage 4 along the screw shafts 3c and 3d in the X direction.

Thus, the X carriage 4 is guided movably in the X direction on the guides 3a and 3b on the frame element 2 of the machine tool frame by means of actuating the X linear axis and includes a monolithically formed frame element, which is formed, for example, from a fibre reinforced plastic, in particular from a carbon fibre reinforced plastic.

On the outer sides of the frame element 2 of the frame of the machine tool, four foot elements 9 are arranged on each of the four frame portions. The foot elements serve to place the machine tool 1 on a surface, e.g., on a surface of a large-area workpiece.

In FIGS. 1 to 5, a cap element 21 (cover element, or cover, optionally made of plastics) is arranged or mounted on the X carriage 4 in order to cover or protect the underlying components. In addition, the cap element 21 has the advantage of providing protection against contact for operators of the machine tool 1. However, it is also possible to provide embodiments without a cap element 21.

The frame element of the X carriage 4 has two transverse beams 4a and 4b each extending from the guide 3a on a frame portion of the frame element 2 to the opposing frame portion of the frame element 2 and the guide 3b.

A Y carriage 5 of a Y linear axis (second linear axis), which can be moved in the Y direction by means of a drive (not shown), is held on the underside of the X carriage 4. For example, the X direction is orthogonal to the Y direction and the undersides of the transverse beams 4a and 4b of the X carriage 4 have respective guides (not shown) extending in the Y direction on which the Y carriage 5 of the Y linear axis is guided.

The Y carriage 5 is guided moveable in the Y-direction on the guides on the underside of the frame element 4 of the X-carriage by means of the Y linear axis (see FIG. 1D) and has a monolithically formed frame element which is formed, e.g., from a fibre reinforced plastic, in particular from a carbon fibre reinforced plastic.

In this preferred embodiment, the X and the Y carriages are each formed from a fibre reinforced plastic or each comprise a respective frame element made of a fibre reinforced plastic. In further embodiments, it is, of course, possible to form one or both of these carriages or their frame elements from another material, e.g., preferably aluminum for reasons of weight.

A turret element 6, which extends in a Z-direction extending, for example, orthogonally to the X and Y directions of the X and Y linear axes, is held centrally on the Y carriage 5 of the Y linear axis.

A rotary direct drive (not shown) is arranged on the Y carriage 5 of the Y linear axis and is configured to drive the tower element 6 to rotate about a rotational axis (second rotational axis, preferably controllable over at least 360°), which is parallel to the Z direction.

A Z carriage 8 of a Z linear axis (third linear axis), which can be moved in the Z direction by means of a further linear drive, is arranged in the interior of the exemplary hollow-shaped turret element 6.

At the lower end of the Z carriage 8, a spindle device with a machining element 12 (e.g., a machining head, e.g., a milling head) is arranged; see, e.g., FIG. 1D. The machining element 12 or the spindle device includes a tool spindle 13 with a tool holder 14 on which a milling tool 15 for machining a workpiece is held, for example. A spindle drive for driving the spindle is arranged in the spindle housing of the spindle 13. The spindle device and its exemplary structure will be described below with reference to FIGS. 2 and 3.

In preferred embodiments of the invention, a piezoelectric actuator (as an electrical load) or a similar vibration drive (electrical load) may additionally be provided in order to additionally drive a vibration movement in the tool, in which the tool vibrates in the direction of the spindle axis. This is particularly advantageous in the machining of composite components and surfaces of fibre composite materials, since ragged edge formation or fraying on the machined surface can be avoided.

The machining element 12 or the spindle device is arranged or held on the lower end of the Z carriage 8 which projects into the turret element 6 rotatable about the Z axis with the rotary direct drive on the Y carriage 5 and is held moveable in the Z direction on the turret element 6.

A further rotary direct drive 11 configured to rotate the machining element 12 with the spindle 13 rotationally about a rotation axis (second rotation axis, optionally formed as a pivot axis, preferably controllable over at least 180°), which is oriented, for example, perpendicularly to the Z direction, is provided at the lower end of the Z carriage 8, for example.

Attached to one side of the machining element 12A is, for example, a measuring means 17, which may comprise, for example, a laser measuring system for measuring the surface of the workpiece or for determining a position of the machine tool 1 relative to the workpiece and/or other non-contact measuring systems for examining the surface of the workpiece (for example, an optical system with a camera and/or an ultrasonic measuring system). Such a measuring means (or parts of such a measuring means) may also be arranged on the inner side of the frame 2. Moreover, in further embodiments, such a measuring means may also be provided as part of the spindle device as an electrical load of the spindle device.

Moreover, in further embodiments, the machine tool 1 preferably comprises a laser tool measuring system or a laser tool measuring means which may be arranged either on the machining element 2 and/or on the inner side of the frame 2 in order to measure a tool 15 held on the spindle 13 or the position thereof by means of a laser. An optional laser tool measuring device 24 is arranged on the inner side of the frame 2 in FIG. 1D, for example. This opens up, for example, the possibility of measuring the tool length and diameter of the tool 15 held on the spindle 13 by means of the tool laser of the tool measuring device 24, which is attached to the frame in the interior of the machine.

A cable guide (not shown) extending from the Y carriage 5 may be connected to the machining element 12 and then provides the electrical power supply for the spindle drive, the direct drive 11, the piezoelectric drive and/or the measuring means 17 or other electrical loads. In addition, control signals may be transmitted to the spindle drive and the direct drive 11 via the cable guide 16 and sensor signals may be read out from the measuring means 17.

Further cable guides (e.g., for actuator signals, sensor signals or the electrical power supply) are preferably led in cable ducts, which, in preferred embodiments, are formed on or in the monolithic frame element 2.

In FIGS. 1A and 1D, for example, an interface opening 19 is formed externally at a corner of the frame member 2 as an end of cable guide ducts formed on the frame member 2, which lead directly or indirectly to one or more of the carriages and the drives on the carriage of the axes.

Herein, the machine tool 1 also preferably provides external connections arranged on the frame element 2, e.g. the already mentioned control interface 19, for connecting a power connection for electrical power supply and/or for connecting a communication connection for actuator and/or sensor signal transmission from/to an external control device, and/or also a suction connection 20 for an external suction device (optionally preferably via a connection of internal suction ducts at or in the frame element 2 to the suction openings 18).

FIG. 2 shows, by way of example, a schematic perspective view of a spindle device 100 according to an embodiment of the present invention.

The spindle device 100 according to this embodiment includes a spindle housing 110. On the spindle side on the spindle housing 110, a tool holder 14, which can be driven rotationally about the spindle axis, is arranged on the spindle 13, which is adapted to hold a tool (see tool 15 in FIGS. 1A to 1D).

In this embodiment, the tool holder 14 is, for example, formed such that the receiving element of the tool holder 14, which is non-rotatably connected to the spindle 13 or the spindle rotor described later, is configured to hold a tool, e.g. a milling or drilling tool, directly (i.e., in particular, without a replaceable tool interface).

In particular, this advantageously allows designing the spindle device 100 particularly compact so that the spindle device 100 is excellently suitable for a mobile machine tool.

However, the present invention is not limited to spindle devices with a direct tool holder according to FIGS. 2 and 3, but rather other preferred and exemplary embodiments may be provided in which the tool holder of the spindle device is configured to hold a replaceable tool interface, i.e., particularly preferably a replaceable hollow shank taper tool interface or also a replaceable steep taper tool interface.

In the embodiment according to FIGS. 2 and 3, the spindle housing 110 of the spindle device 100 additionally comprises, for example, a pneumatic or hydraulic port 111 as well as a fastening element 112 with which the spindle device 110 can be attached or fastened to the machining element 12 or the tool head.

Furthermore, connections 113 for connecting one or more cable guides for sensor signals and actuator signals (e.g., for the spindle drive) and optionally also for power cables for the electrical power supply of the spindle drive and/or the electrical load of the spindle device 100 (such as a measuring means and/or a vibration unit or a coil unit) are provided at the fastening element 112.

FIG. 3 shows, by way of example, a schematic sectional view of the spindle device 100 according to an embodiment of the present invention.

Inside the spindle housing 110 of the spindle device 100, the spindle device 100 includes a spindle drive which has a spindle rotor 130 rotatably supported in a spindle stator 120.

When the spindle of the spindle device 100 is driven, the spindle rotor 130 is rotationally driven, in preferred embodiments based on an electric motor by means of electromagnetic induction. In further embodiments, however, the spindle rotor 130 may also be driven indirectly via a gear unit (not shown) in a mechanical manner.

At one end of the spindle rotor 130, the tool holder 14 rotatably mounted on a bearing element 190 is arranged, which in this embodiment is configured as a one-piece tool holder element which includes a labyrinth coupling 14 at a central portion. The labyrinth coupling advantageously allows for a vibration of the tool holder 14 in the axial direction of the spindle device 100 or in the spindle axis direction.

In addition, the tool holder 14 includes, by way of example, a pin portion 14b arranged in the interior of the spindle housing 110 (optionally with a thread). A receiving portion 14c of the tool holder 14 protrudes outwardly from the spindle housing 110 and is configured, for example, for the direct reception of a tool (i.e., without an replaceable hollow shank taper interface or a replaceable steep taper interface).

However, the invention is not limited to one-piece tool holder elements, and in further embodiments, the tool holder 14 may also be formed in several pieces or in several parts.

Furthermore, the spindle device 100 comprises, by way of example, a vibration unit 160 for driving a vibration (or oscillation) of the tool holder 14.

For example, the vibrating unit 160 comprises, in this embodiment, four piezoelectric actuators 161, 162, 163 and 164 arranged successively in the axial direction or piezoelectric actuators of a piezoelectric drive, each of which is arranged circumferentially on the pin portion 14b of the tool holder 14.

For example, in this embodiment, an oscillator unit is provided, which can drive a vibration in the axial direction. However, the invention is not limited to such axial oscillator units. Rather, in other embodiments, it is alternatively or additionally possible to drive a vibration of the tool holder in one or more radial directions of the spindle device (e.g., by means of one or more radial oscillator units) and/or to drive a vibration of the tool holder in the rotational direction of the spindle (e.g., by means of a rotational oscillator unit).

The piezoelectric actuators 161, 162, 163 and 164 of the vibration unit 160 are, for example, fastened to the tool holder 14 by means of a spacer disc 182 and a fastening element 181 (e.g. formed as a nut element).

Respective electrical contact plates, via which the piezoelectric actuators 161, 162, 163 and 164 are each electrically connected to electrical line contacts 151 and 152, are, for example, arranged between the piezoelectric actuators 161, 162, 163 and 164.

In the interior of the spindle rotor 130, the spindle device 100 includes an axially arranged hollow shank element 150, which is led through the spindle rotor 130 from one end to the other end of the spindle rotor 130 along the rotational axis of the spindle rotor 130 or along the spindle axis of the spindle device 100 and is connected, for example, non-rotatably to the spindle rotor 130.

The electrical line contacts 151 and 152 or the electrical lines thereof (such as single-pole cables or a multi-pole cable) are led, by way of example, along the rotational axis of the spindle rotor 130 or along the spindle axis of the spindle device 100 through the hollow shank element 150 to the side of the spindle rotor 130 facing away from the tool holder 14.

Furthermore, a coil unit 140 is arranged on the side of the spindle rotor 130 facing away from the tool holder 14, which comprises, for example, a fixed transmitter coil 142, which is connected to the spindle housing 110 or attached to the spindle housing 110, and a rotatably mounted receiver coil 141, A thin gap or air gap not shown in FIG. 3 is provided between the transmitter coil 142 and the receiver coil 141 in such a way that a electrical or electromagnetic non-contact energy transfer from the transmitter coil 142 to the (possibly rotating) receiver coil 141 is made possible, in particular for the electrical power supply to the vibration unit 160 as a possible embodiment of an electrical load.

Herein, the electrical line contacts 151 and 152 are electrically connected to the receiver coil 141 on the side of the spindle rotor 130 facing away from the tool holder 14 (connection not shown in FIG. 3)

In particularly preferred embodiments, preferably both the transmitter coil 142 and the receiver coil 141 are each formed as a full-circumference coil.

When the spindle is driven, i.e., when the spindle rotor 130 rotates, the receiver coil 141 of the coil unit 140, the vibrating unit 160 with electrical lines 151 and 152 and the hollow shank element 150, as well as the tool holder 14, co-rotate at the same speed with the spindle rotor 130, whereby the non-contact energy transfer from the transmitter coil 142 (which is connected to an external energy source, preferably to a radio-frequency AC source) to the receiver coil 141 is made possible, and thus the vibration unit 160 may be driven or supplied with electrical energy.

The vibration unit 160 is configured to drive a vibration of the tool holder 14 in the axial direction of the spindle device 100, in particular a vibration with a frequency in the ultrasonic range.

Via the exemplary labyrinth coupling 14*a*, the tool holder 14 is connected to the spindle rotor 130 in a decoupled manner such that the tool holder 14 rotates with the spindle rotor 130 in a rotationally fixed way relative to the spindle rotor 130 but vibrates or oscillates in the axial direction in a manner decoupled from the spindle rotor 130.

In summary, the present invention and the embodiments thereof advantageously allow to provide a spindle device which allows for a simple and compact design and furthermore allows for simple and efficient tool changing, preferably without deteriorating the efficiency of the energy transfer between the coils.

The invention claimed is:

1. A spindle device comprising:
   a spindle stator;
   a spindle rotor rotatable relative to the spindle stator about a spindle axis defined by a centerline of the spindle rotor, wherein the spindle rotor has a first end and a second distal end, the first end and the second distal end being on axially opposite sides of the spindle rotor with respect to the extension of the spindle axis;
   a tool holder configured to hold a tool or a tool-holding tool interface at the first end of the spindle rotor, wherein said tool holder is mounted on said first end of said spindle rotor;
   a spindle drive for rotationally driving said spindle rotor, on which said tool holder is mounted, about said spindle axis relative to the spindle stator;
   at least one electrical load coupled between said spindle rotor and said tool holder;
   and
   a coil unit for supplying electrical energy to the at least one electrical load, wherein said coil unit is arranged facing away from said tool holder on said second distal end of said spindle rotor, wherein:
   said coil unit comprises a transmitter coil and a receiver coil for non-contact energy transfer from the transmitter coil to the receiver coil,
   energy transferred to the receiver coil travels axially inside said spindle rotor along said spindle axis from the receiver coil to the at least one electrical load,
   said receiver coil is attached to an end portion of said spindle rotor on the second distal end of said spindle rotor,
   said transmitter coil is fixedly connected to the spindle stator such that the receiver coil is rotating with respect to the transmitter coil when the spindle rotor is rotating with respect to the spindle stator,
   said electrical load comprises a vibration unit which is attached to said tool holder,
   said vibration unit is configured to drive vibrations of said tool holder in the axial direction and in a radial direction of said spindle device,
   and/or said vibration unit is configured to drive a vibration of said tool holder in a rotational direction of said spindle device,
   wherein the driven axial, radial, and/or rotational vibrations of said tool holder have a frequency in the ultrasonic range.

2. The spindle device of claim 1 wherein said coil unit comprises a gap located between said transmitter coil and said receiver coil for non-contact energy transfer.

3. The spindle device of claim 1 wherein said transmitter coil and said receiver coil are each formed as a full-circumference coil.

4. The spindle device of claim 1 wherein said transmitter coil is attached to a spindle housing which accommodates said spindle rotor.

5. The spindle device of claim 1 wherein said coil unit is connected to said electrical load by means of electrical lines, wherein at least one portion of said electrical lines is led axially along a rotational axis of said spindle rotor from said first end to said second distal end of said spindle rotor.

6. The spindle device of claim 5, wherein said spindle rotor comprises an axially arranged hollow shank element through which said at least one portion of said electrical lines is led axially along the rotational axis of said spindle rotor.

7. The spindle device of claim 1 wherein said electrical load comprises an electronic measuring device.

8. The spindle device of claim 1 wherein said vibration unit comprises a piezoelectric actuator or a plurality of piezoelectric actuators arranged successively in the axial direction.

9. The spindle device of claim 1 wherein said vibration unit is attached non-rotatably to said tool holder.

10. The spindle device of claim 1 wherein said tool holder is connected to said spindle rotor via a labyrinth coupling.

11. The spindle device of claim 1 wherein:
    said tool-holding tool interface to be held by said tool holder is a replaceable tool interface comprising a hollow shank taper tool interface or a steep taper interface.

12. A machine tool for machining a workpiece, the machine tool comprising:
    a spindle device including:
    a spindle stator;
    a spindle rotor rotatable relative to the spindle stator about a spindle axis defined by a centerline of the spindle rotor, wherein the spindle rotor has a first end and a second distal end, the first end and the second distal end being on axially opposite sides of the spindle rotor with respect to the extension of the spindle axis;
    a tool holder configured to hold a tool or a tool-holding tool interface at the first end of the spindle rotor, wherein said tool holder is mounted on said first end of said spindle rotor;
    a spindle drive for rotationally driving said tool holder and said spindle rotor about said spindle axis relative to the spindle stator;

at least one electrical load coupled between said spindle rotor and said tool holder; and a coil unit for supplying electrical energy to the at least one electrical load, wherein said coil unit is arranged facing away from said tool holder on said second distal end of said spindle rotor, wherein:

said coil unit comprises a transmitter coil and a receiver coil for non-contact energy transfer from the transmitter coil to the receiver coil, wherein energy transferred to the receiver coil travels axially inside said spindle rotor along the spindle axis from the receiver coil to the at least one electrical load, said receiver coil is attached to an end portion of said spindle rotor on the second distal end of said spindle rotor, said transmitter coil is fixedly connected to the spindle stator such that the receiver coil is rotating with respect to the transmitter coil when the spindle rotor is rotating with respect to the spindle stator, said electrical load comprises a vibration unit which is attached to said tool holder, said vibration unit is configured to drive vibrations of said tool holder in the axial direction and in a radial direction of said spindle device, and/or said vibration unit is configured to drive a vibration of said tool holder in a rotational direction of said spindle device, wherein the driven axial, radial, and/or rotational vibrations of said tool holder have a frequency in the ultrasonic range.

13. The machine tool of claim 12 wherein said coil unit comprises a gap located between said transmitter coil and said receiver coil for non-contact energy transfer.

14. The machine tool of claim 12 wherein said transmitter coil and said receiver coil are each formed as a full-circumference coil.

15. The machine tool of claim 12 wherein said transmitter coil is attached to a spindle housing which accommodates said spindle rotor.

16. The machine tool of claim 12 wherein said coil unit is connected to said electrical load by means of electrical lines, wherein at least one portion of said electrical lines is led axially along a rotational axis of said spindle rotor from one end of said spindle rotor to the other end of said spindle rotor.

17. The machine tool of claim 16 wherein said spindle rotor comprises an axially arranged hollow shank element through which said at least one portion of said electrical lines is led axially along the rotational axis of said spindle rotor.

18. The machine tool of claim 12 wherein said electrical load comprises an electronic measuring device.

19. The machine tool of claim 12 wherein said vibration unit comprises a piezoelectric actuator or a plurality of piezoelectric actuators arranged successively in the axial direction.

20. The machine tool of claim 12 wherein said vibration unit is attached non-rotatably to said tool holder.

21. The machine tool of claim 12 wherein said tool holder is connected to said spindle rotor via a labyrinth coupling.

22. The machine tool of claim 12 wherein:

said tool-holding tool interface to be held by said tool holder is a replaceable tool interface comprising a hollow shank taper tool interface or a steep taper interface.

23. The spindle device of claim 1 wherein said receiver coil is attached on a surface of said spindle rotor, said surface of said spindle rotor facing away from said tool holder.

24. The machine tool of claim 12 wherein said receiver coil is attached on a surface of said spindle rotor, said surface of said spindle rotor facing away from said tool holder.

25. The spindle device of claim 1, further comprising one or more conductors electrically coupled to the receiver coil and to the at least one electrical load and positioned along the spindle axis, wherein energy travels axially along the one or more conductors from the receiver coil to the electrical load.

26. The machine tool of claim 12, further comprising one or more conductors electrically coupled to the receiver coil and to the at least one electrical load and positioned along the spindle axis, wherein energy travels axially along the one or more conductors from the receiver coil to the electrical load.

27. The spindle device of claim 1 wherein said spindle rotor has a surface at the second distal end, and wherein at least part of the coil unit is mounted to the surface at the second distal end.

28. The machine tool of claim 12 wherein said spindle rotor has a surface at the second end, and wherein at least part of the coil unit is mounted to the surface at the second distal end.

29. The spindle device of claim 27 wherein there is a gap between the coil unit and the spindle stator.

30. The machine tool of claim 28 wherein there is a gap between the coil unit and the spindle stator.

* * * * *